(12) United States Patent
Osborn

(10) Patent No.: US 12,251,998 B2
(45) Date of Patent: Mar. 18, 2025

(54) CONVERTIBLE TONNEAU COVER

(71) Applicant: Troy M. Osborn, Upper Sandusky, OH (US)

(72) Inventor: Troy M. Osborn, Upper Sandusky, OH (US)

(*) Notice: Subject to any disclaimer, the term of this patent is extended or adjusted under 35 U.S.C. 154(b) by 0 days.

(21) Appl. No.: 18/436,118

(22) Filed: Feb. 8, 2024

(65) Prior Publication Data

US 2024/0174063 A1 May 30, 2024

Related U.S. Application Data

(63) Continuation of application No. 17/748,274, filed on May 19, 2022, now Pat. No. 11,926,203.

(60) Provisional application No. 63/190,516, filed on May 19, 2021.

(51) Int. Cl.
*B60J 7/14* (2006.01)
*B60J 7/16* (2006.01)

(52) U.S. Cl.
CPC ............ *B60J 7/141* (2013.01); *B60J 7/1614* (2013.01)

(58) Field of Classification Search
CPC ........ B60J 7/141; B60J 7/1607; B60J 7/1614; B60P 7/02

USPC ............... 296/10.02, 100.03, 100.1
See application file for complete search history.

(56) References Cited

U.S. PATENT DOCUMENTS

| | | | |
|---|---|---|---|
| 4,768,824 | A | 9/1988 | Andonian |
| 5,951,095 | A | 9/1999 | Herndon |
| 6,505,878 | B1 | 1/2003 | Mascolo |
| 6,896,313 | B2 | 5/2005 | Mack et al. |
| 6,929,303 | B1 | 8/2005 | Sharples |
| 7,243,965 | B2 | 7/2007 | King et al. |
| 9,150,087 | B2 | 10/2015 | Aho et al. |
| 9,475,371 | B2 | 10/2016 | LaBiche |
| 10,160,299 | B2 | 12/2018 | Molinar Olivas |
| 10,538,151 | B2 | 1/2020 | Sullivan |
| 2004/0164578 | A1 | 8/2004 | Mack et al. |
| 2006/0066130 | A1 | 3/2006 | King et al. |
| 2008/0164721 | A1 | 7/2008 | Semotuk |
| 2008/0174142 | A1 | 7/2008 | Pearlman |
| 2019/0168590 | A1 | 6/2019 | O'Reilly |
| 2019/0210664 | A1 | 7/2019 | Williams |

*Primary Examiner* — Jason S Daniels
(74) *Attorney, Agent, or Firm* — Jacob M. Ward; Ward Law Office LLC

(57) ABSTRACT

A truck bed cover may include a top panel and a plurality of side panels. The top panel may be slidably and pivotably connected to each of the side panels. Each side panel may be connected to a truck bed rail. The side panels may be pivotably connected to the truck bed rail, in particular. Each of the top panel and the side panels are configured to selectively move between a tonneau cover configuration and a cap configuration.

20 Claims, 8 Drawing Sheets

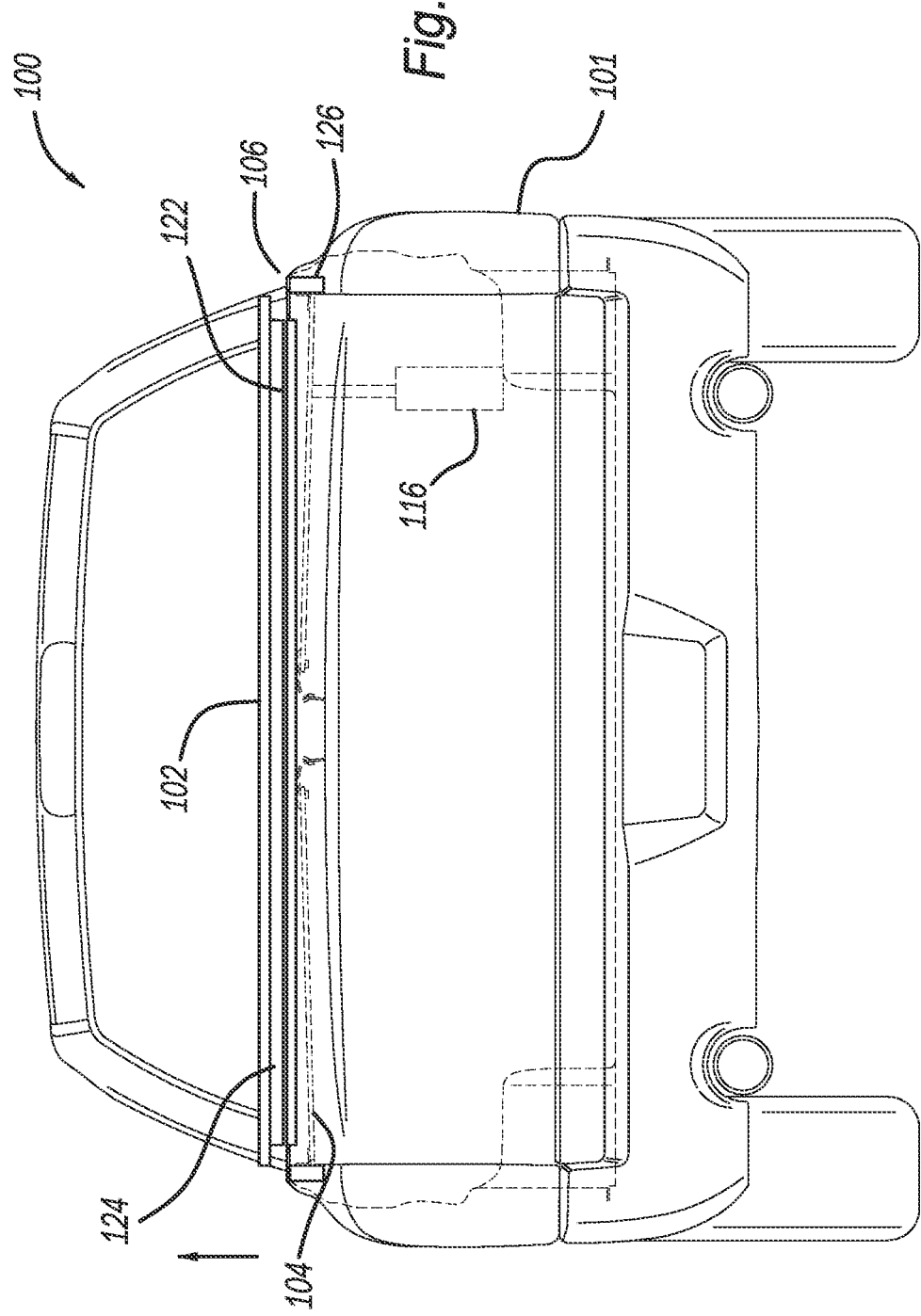

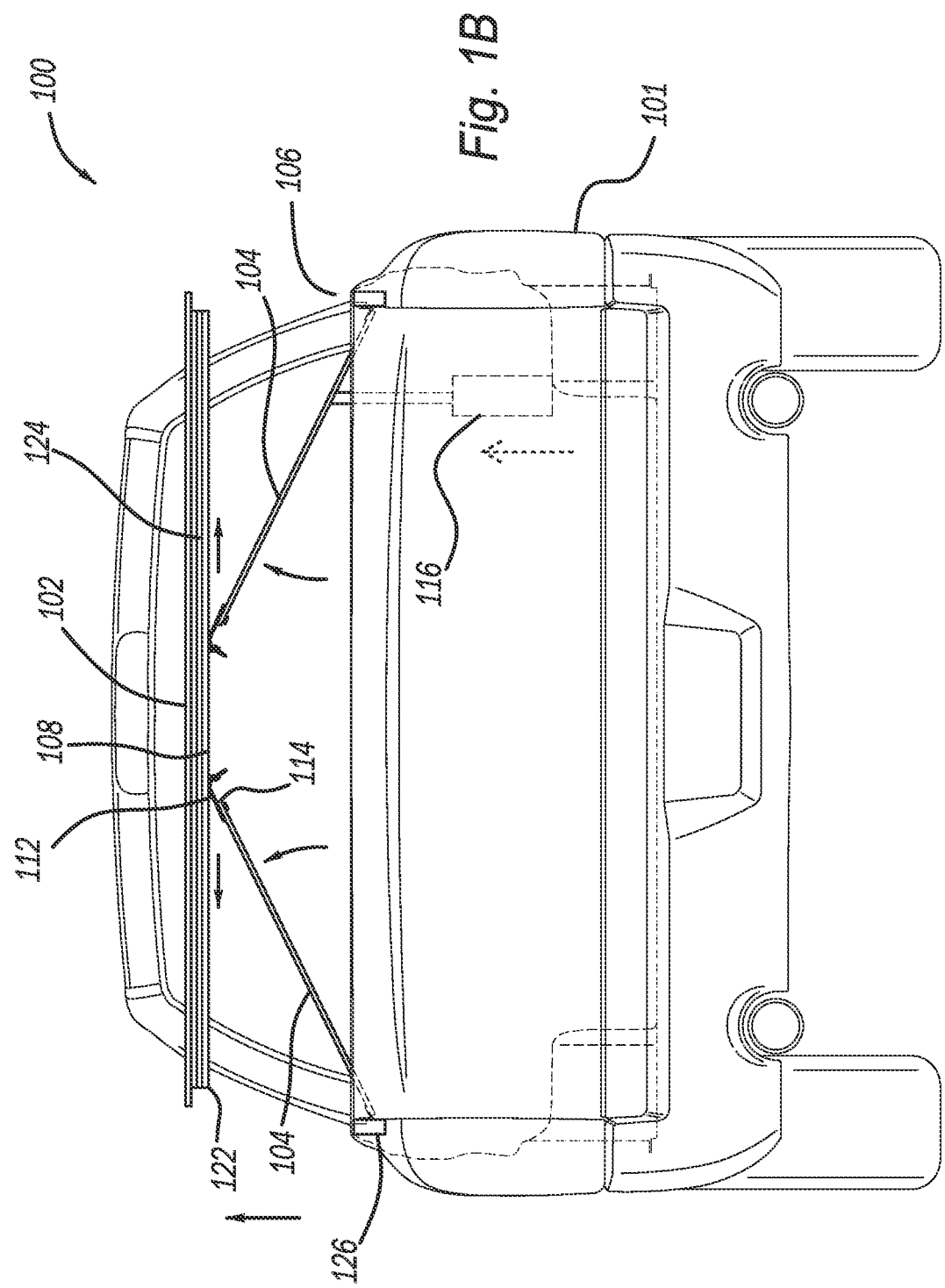

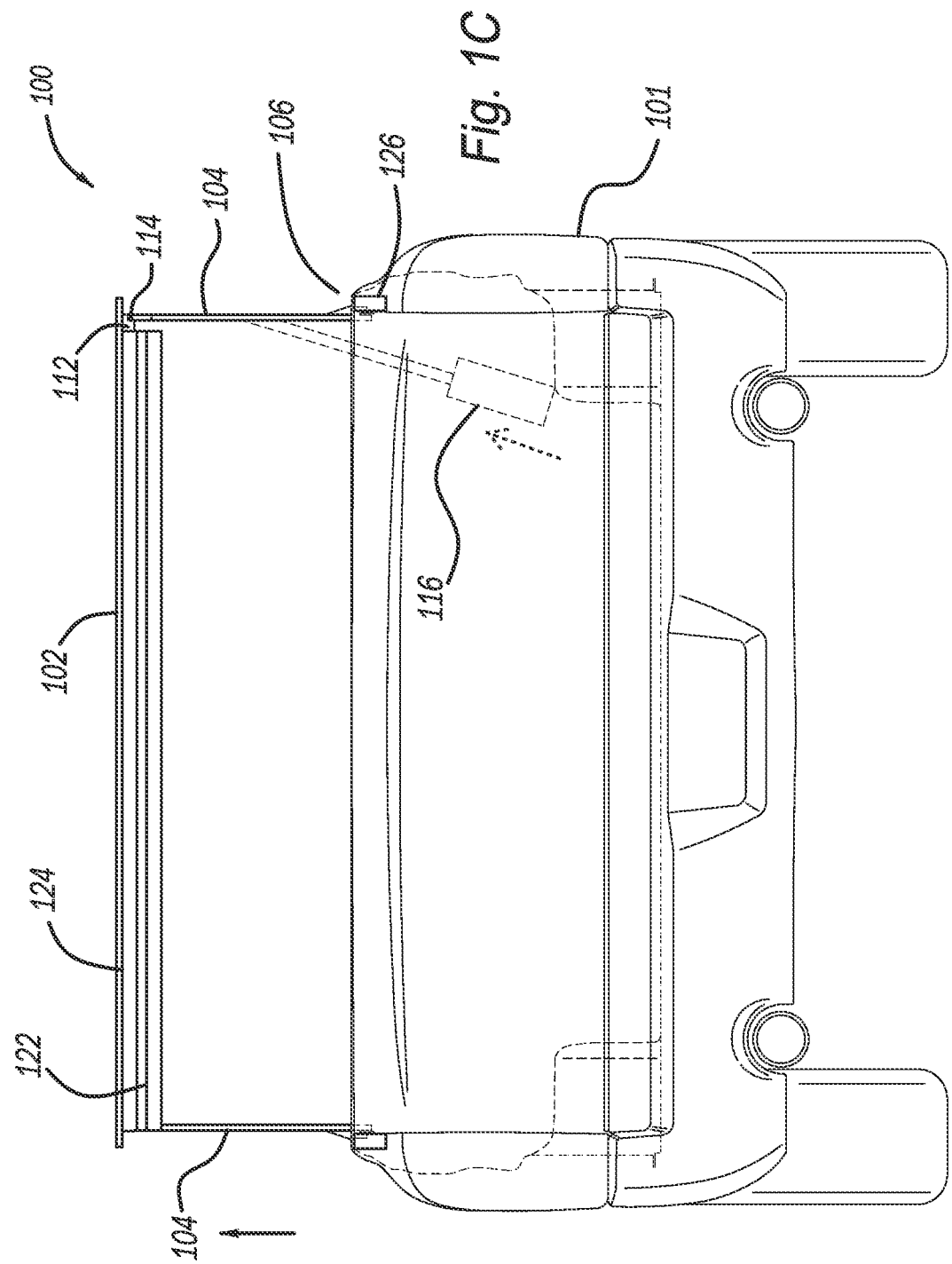

CONVERTIBLE TONNEAU COVER

CROSS-REFERENCE TO RELATED APPLICATIONS

This application is a continuation of U.S. patent application Ser. No. 17/748,274, filed on May 19, 2022, which claims the benefit of U.S. Provisional Application No. 63/190,516, filed on May 19, 2021. The entire disclosures of the above applications are incorporated herein by reference.

FIELD

The present disclosure relates to a tonneau cover and, more specifically, to a convertible tonneau cover.

INTRODUCTION

The statements in this section merely provide background information related to the present disclosure and may not constitute prior art.

Various styles of truck bed covers are available to provide environmental protection to the contents of a pickup truck bed. Some common styles include hinged tonneau covers that tilt up to open, roll-up tonneau covers, and truck bed caps that are also referred to as canopies, toppers, and camper shells. Each style has its advantages and disadvantages, and some styles are better suited for certain applications.

In the past, a truck owner had to choose one type of cover to be installed, and once installed, it was a significant task to remove it and replace it with a different type of cover. Thus, truck owners have generally been limited to selecting and using only one type of cover once installed on the truck bed.

There is a continuing need for a truck bed cover, which may be converted between a tonneau cover and a cap.

SUMMARY

In concordance with the instant disclosure, a truck bed cover, which may be converted between a tonneau cover and a cap, has been surprisingly discovered.

A truck bed cover may include a top panel and a plurality of side panels. The top panel may be slidably and pivotally connected to each of the side panels. Each side panel may be connected to a truck bed rail. The side panels may be pivotably connected to the truck bed rail, in particular. Each of the top panel and the side panels are configured to selectively move between a collapsed tonneau cover configuration and an extended cap configuration.

In certain embodiments, a truck bed cover may include a top panel, a plurality of side panels connected to the top panel, and a rear panel, slidably disposed within the top panel. The top panel and the plurality of side panels may be configured to move between a collapsed tonneau configuration and an extended cap configuration. The rear panel may be configured to slide out from the top panel to form the rear panel of the truck bed cover in the extended cap configuration. In certain embodiments, the rear panel includes a window. The rear panel may include a rear panel locking portion configured to releasably lock with a side panel locking portion of one or more side panels to secure the rear panel in the extended cap configuration. In certain embodiments, the truck bed cover may include a front panel slidably disposed with the top panel.

Each of the side panels may be pivotally connected to the truck bed at a first end, and slidably connected to the top panel at a second end opposite the first end. Each of the side panels may also be slidably connected to a track system of a bottom surface of the top panel. In certain embodiments, each of side panels is configured to slide along the track system in an outward direction to move the truck bed cover to the extended cap configuration. In certain embodiments, each of the side panels is configured to slide along the track system in an inward direction to move the truck bed cover to the collapsed tonneau configuration. The truck bed cover may be manually moved between the collapsed tonneau configuration and the extended cap configuration.

In certain embodiments, the truck bed cover may include a motor for moving the truck bed cover between the collapsed tonneau configuration and the extended cap configuration. The motor may include one of a linear motion actuator, a pneumatic arm and a hydraulic motor, or a combination thereof. In certain embodiments, the truck bed cover includes the motor and a threaded rod for moving the truck bed cover between the collapsed tonneau configuration and the extended cap configuration. The threaded rod may be turned by the motor to move the truck bed cover between the collapsed tonneau configuration and the extended cap configuration. As the threaded rod is turned, one or more connections of the side panels may be moved along a length of the rod.

In certain embodiments, a method of using a truck bed cover includes placing the truck bed cover on a truck bed in a first collapsed tonneau configuration, converting the truck bed cover from the first collapsed tonneau cover configuration to a second extended cap configuration, slidably removing a rear panel from a top panel of the truck bed, and rotating the rear panel down from the top panel to form the rear panel adjacent to a plurality of side panels of the truck bed cover.

A motor of the truck bed cover may be actuated to move the truck bed cover from the first collapsed tonneau cover configuration to the second extended cap configuration. In certain embodiments, actuating the motor turns a threaded rod to move the truck bed cover between the collapsed tonneau configuration and the extended cap configuration. Alternatively, the top panel of the truck bed cover may be lifted to convert the truck bed cover from the collapsed tonneau cover configuration to the extended truck cap configuration. A front panel may be rotated from a stored position to form a front panel of the truck bed cover. The back panel of the truck bed cover may be locked to one or more side panels of the truck bed cover.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is a rear view of a first embodiment of a truck bed cover in a collapsed configuration, in accordance with the present technology;

FIG. 1B is a rear view of the first embodiment of the truck bed cover in a partially extended cap configuration;

FIG. 1C is a rear view of the first embodiment of the truck bed cover in an extended cap configuration;

DETAILED DESCRIPTION

Figure 2:
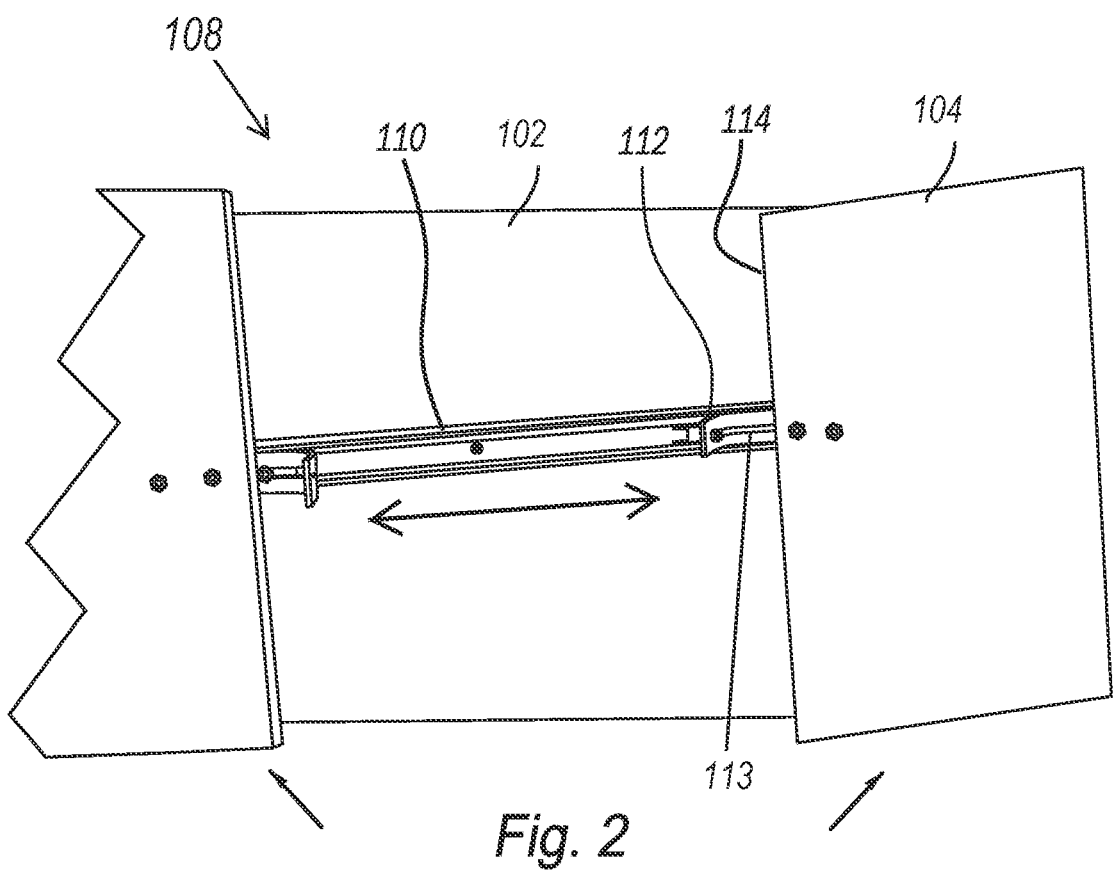
FIG. 2 is a close-up view of a track system of the first embodiment of the truck bed cover with a rear panel and a front panel in a stored configuration.
Figure 3:
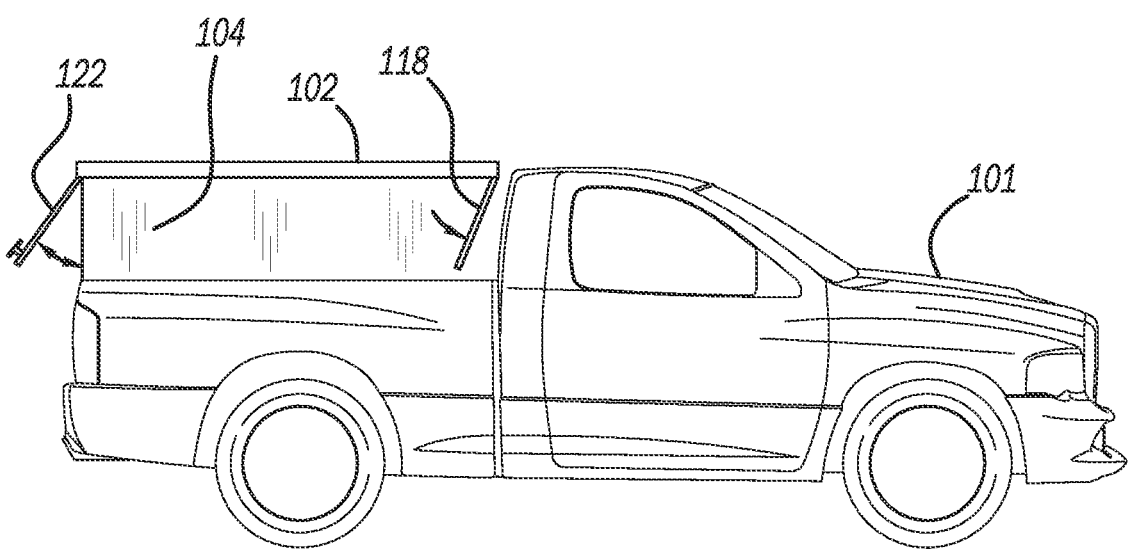
FIG. 3 is a side view of the first embodiment of the truck bed cover in an extended cap configuration.
Figure 4:
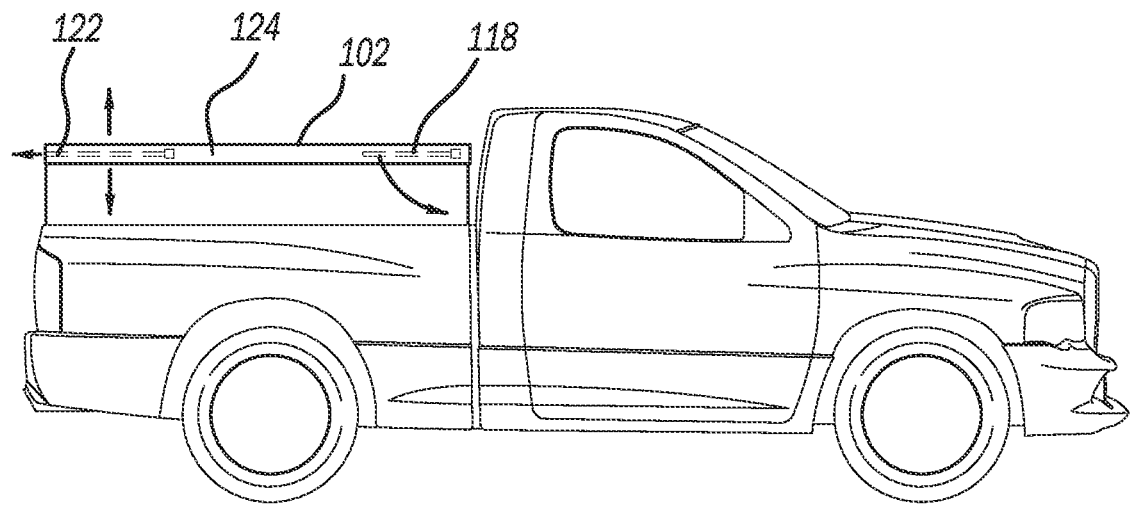
FIG. 4 is a side view of the first embodiment of the truck bed cover with the rear panel and the front panel in the stored configuration.
Figure 5A:
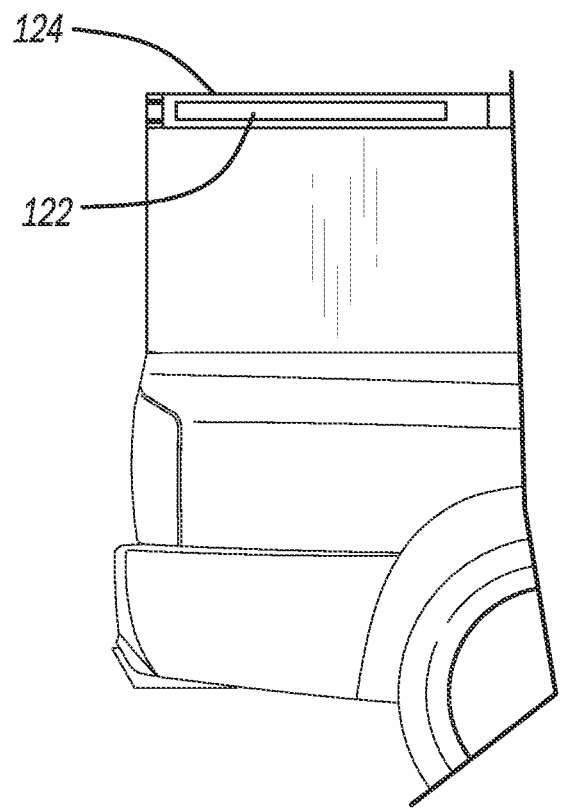
FIG. 5A is a cut-out side view of the first embodiment of the truck bed cover with a rear panel in the stored configuration.
Figure 5B:
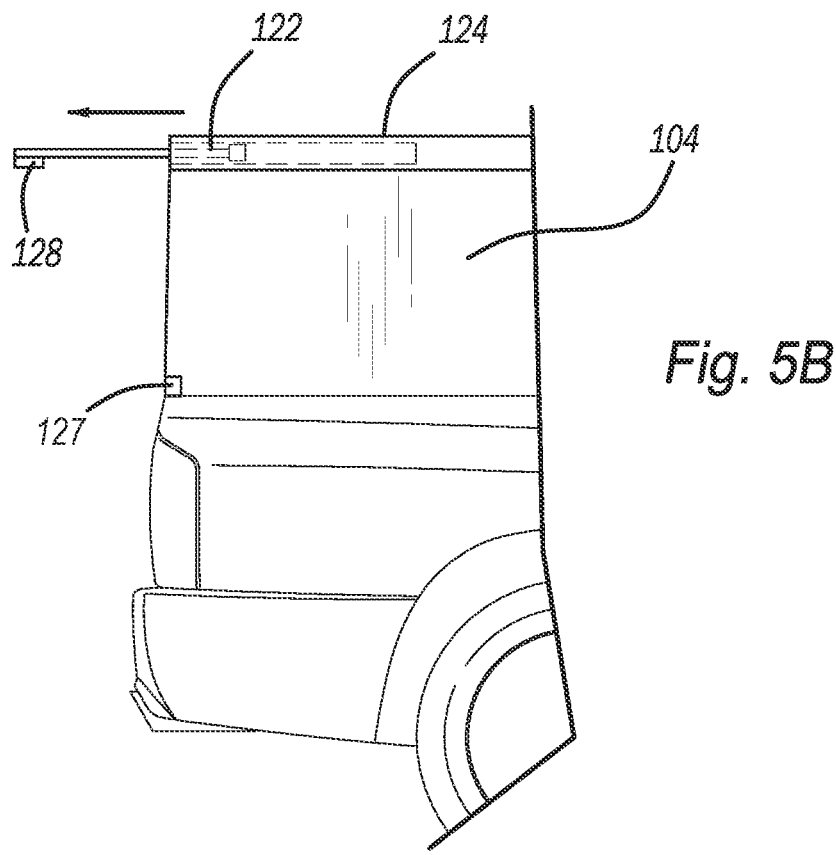
FIG. 5B is a cut-out side view of the first embodiment of the truck bed cover with the rear panel in a partially removed configuration.
Figure 5C:
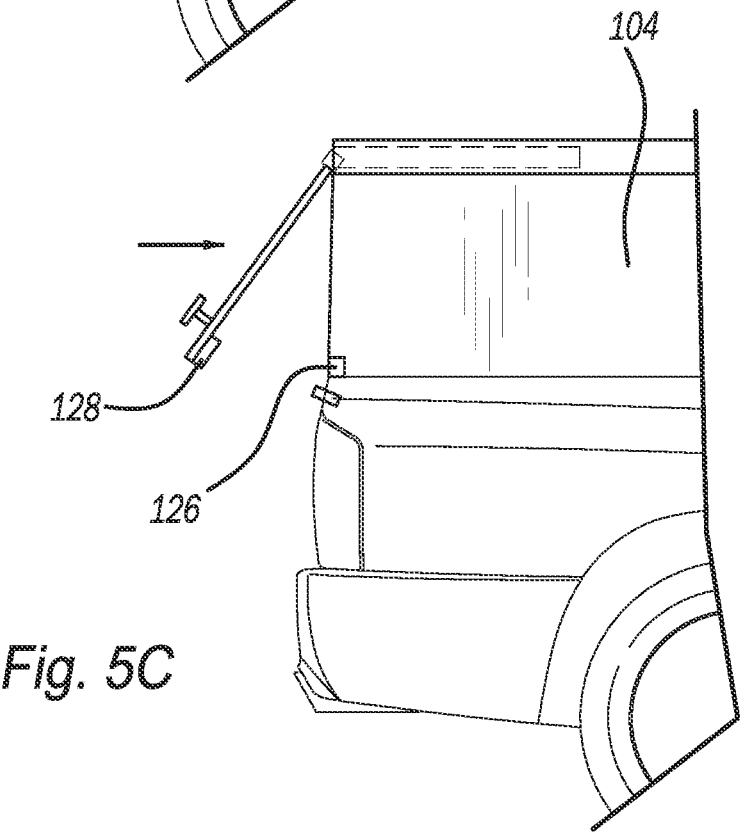
FIG. 5C is a cut-out side view of the first embodiment of the truck bed cover with the rear panel in a removed configuration.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a truck bed cover moveable between a collapsed tonneau style cover configuration and an extended cap or canopy configuration. A top panel may be slidably and pivotably connected to one or more side panels. Each side panel may be connected to a truck bed rail. The side panels may be pivotably connected to the truck bed rail such that the side panels may pivot about the truck bed rail and slide along a track system of the top panel to move between the collapsed tonneau configuration and the extended cap or canopy configuration.

In certain embodiments, a truck bed cover may include a top panel, a plurality of side panels slidably connected to the top panel, and a rear panel slidably disposed within the top panel. The top panel and the plurality of side panels may be configured to move between a collapsed tonneau configuration and an extended cap configuration. The rear panel may be configured to slide out from the top panel to form the rear panel of the truck bed cover in the extended cap configuration. The rear panel may include a window. In certain embodiments, the rear panel includes a rear panel locking portion configured to releasable lock with a side panel locking portion of one or side panels to secure the rear panel in the extended cap configuration. In certain embodiments, the cover for the truck bed may further include a front panel which may be slidably disposed within the top panel. Alternatively, the front panel may fold with the top panel and the plurality of side panels in the collapsed tonneau configuration.

Each of the side panels may be pivotably connected to the truck bed at a first end and slidably connected to the top panel, at a second opposite end. In particular, each of the side panels may be configured to be pivotably connected to a respective side rail of the truck bed at the first end. Each of the side panels may be configured to slide along a track section connected to a bottom surface of the top panel. For example, the side panels may be configured to slide along the track section in an outward direction as the side panels pivot about the side rails to move the truck bed cover to the extended cap configuration. Similarly, the side panels may be configured to slide along the track section in an inward direction, as the side panels pivot about the side rails to move the cover for the truck bed to the collapsed tonneau configuration.

The truck bed cover may be manually moved between the collapsed tonneau configuration and the extended cap configuration. For example, a user may pull and/or push the top panel in an upward direction to move the truck bed cover to the extended cap configuration and push and/or pull the top panel in a downward direction to move the truck bed cover to the collapsed tonneau configuration. Alternatively, a motor may move the truck bed cover between the collapsed tonneau configuration and the extended cap configuration. For example, a motor such as linear actuator, a pneumatic or hydraulic arm, or a combination thereof may be configured to move the truck bed cover between the collapsed tonneau configuration and the extended cap configuration. However, the truck bed cover may include any appropriately desired mechanism for moving the truck bed cover between the collapsed tonneau configuration and the extended cap configuration.

In certain embodiments, the truck bed cover may include a motor and a threaded rod for moving the truck bed cover between the collapsed tonneau configuration and the extended cap configuration. For example, the motor may turn the threaded rod, which moves one or more connections of the plurality of side panels along a length of the threaded rod to move the truck bed cover between the collapsed tonneau configuration and the extended cap configuration.

In certain embodiments, a method of using a truck bed cover may include the steps of placing the truck bed cover on a truck bed in a first collapsed tonneau configuration. Then, the truck bed cover may be converted from the first collapsed tonneau configuration to a second extended cap configuration. A rear panel may be slidably removed from a top panel of the truck bed cover and rotated down from the top panel to form the rear panel adjacent to a plurality of sides of the truck bed cover. In certain embodiments, a motor may move the truck bed cover between the first collapsed tonneau configuration and the second extended cap configuration. In still certain embodiments, the motor may turn a threaded rod to move the truck bed cover between the collapsed tonneau configuration and the extended cap configuration. Alternatively, the top panel of the truck bed cover may be lifted, pulled, or pushed to move the truck bed cover bed cover between the collapsed tonneau configuration and the extended cap configuration. In certain embodiments, a front panel may rotated from a stored position to form a front panel of the truck bed cover. In certain embodiments, the method may further include locking the rear panel to one or more side panels of the truck bed cover.

Examples

Example embodiments of the present technology are provided with reference to the several figures enclosed herewith.

With reference to FIGS. 1-5C, a first embodiment of a truck bed cover 100 is disposed in a truck bed 101 of a truck. The truck bed cover 100 may include a top panel 102 and a plurality of side panels 104. The top panel 102 may be slidably and pivotably connected to each of the side panels 104. Each of the side panels 104 may be connected to a respective truck bed rail 106 at a side panel hinge 126. The side panels 104 may be pivotably connected to the truck bed rail 106, at the side panel hinge 126. In certain embodiments, the truck bed cover 100 may comprise a frame (not shown) that sits in and/or otherwise connects with the truck bed 101 as appropriately desired.

The top panel 102 and the side panels 104 may selectively move between a collapsed tonneau cover configuration as shown in FIG. 1A and an extended cap configuration, as shown in FIG. 1C, where an intermediate partially extended cap configuration is shown in FIG. 1B. In certain embodiments, a motor 116, may move the truck bed cover 100 between the collapsed tonneau cover configuration and the extended cap configuration. The motor 116 may include a linear actuator, a pneumatic or hydraulic arm, or a combination thereof to move the truck bed cover 100 between the collapsed tonneau configuration and the extended cap configuration.

Each side panel 104 may be connected to a respective truck bed rail 106 through a respective side panel hinge 126, which enables the side panels 104 to move in an upward direction and a downward direction. In the collapsed tonneau configuration, as shown in FIG. 1A, each side panel 104 may be folded, such that the side panel 104 is stored under the top panel 102 of the truck bed cover 100. Each side panel 104 may be disposed substantially parallel to a bottom surface of the bed 101 of the truck, and approximately a 90-degree angle to a truck bed rail 106 or the respective side panel hinge 126.

In an extended cap configuration, as shown in FIG. 1C, each side panel 104 may be rotated upward and outward about the respective side panel hinge 126. Each side panel 104 may be disposed substantially parallel to the truck bed 101 and truck bed rail 106 and substantially perpendicular to the bottom surface of the bed 101 of the truck. In the collapsed tonneau configuration, the top panel 102 may be disposed on top of and parallel to each side panel 104. In the extended cap configuration, the top panel 102 may be lifted away from the truck bed 101 and be disposed at an angle relative to each side panel 104.

The top panel 102 and each side panel 104 may be connected via a track system 108. The track system 108 may include a track 110 disposed on a bottom surface of the top panel 102. The track 110 may be arranged along a length of the top panel 102. As shown in FIG. 2, the track system 108 may include a connection portion 112 disposed on each of the side panels 104. Each of the side panels 104 may have a connection portion 112 for the track 110 of the track system 108. In other words, if the track system 108 has more than one track 110, each of the side panels 104 may have respective connection portion 112 that corresponds to a track 110. The connection portion 112 may be disposed adjacent a free edge 114 of one of the side panels 104. As would be apparent to someone of ordinary skill in the art, any suitable number of tracks and connection portions for the track system 108 may be used, as required by the dimensions of the truck bed 101 to be covered. The connection portion 112 may be configured to move about the track 110 of the track system.

Each connection portion 112 may be configured to be slidably disposed in the track 110. In operation, a user may lift the top panel 102 and the side panels may rotate about the side panel hinge 126. As the top panel 102 is lifted and or moves in an upward direction, the side panels 104 move via the connection portion 112 and may slide along the track 110 until the top panel 102 and the side panels 104 are in the cap configuration, as shown in FIG. 1C. Similarly, the top panel 102 and the side panels 104 may be slid in a reverse direction and collapsed down to return to the tonneau configuration, as shown in FIG. 1A. In certain embodiments, the truck bed cover 100 may be locked in one or both of the collapsed tonneau configuration and the extended cap configuration. In certain embodiments, each connection portion 112 may be curved in shape and include a slot 113 which enables the side panel 104 to rotate into place in the extended cap configuration.

With reference to FIGS. 3-5C, the truck bed cover 100 may further include a front panel 118 and a rear panel 122. The front panel 118 may be disposed on the bottom surface of the top panel 102 adjacent to a cab of the truck 101. In the tonneau configuration, the front panel 118 may be disposed between the top panel 102 and the side panels 104. Alternatively, the front panel 118 may be slidably storable within the top panel 102. In the cap configuration, the front panel 118 may swing down to a closed position adjacent to the side panels 104.

The rear panel 122 may be slidably disposed within the top panel 102 such that the rear panel may slid from a top panel storage aperture 124 When the truck bed cover 100 is in the collapsed tonneau configuration, the rear panel 122, which can include a window, may be stored within the top panel 102. When the truck bed cover 100 is in the extended cap configuration, the rear panel 122 may be slid out of the top panel storage aperture 124 until the rear panel 122 and associated window may be rotated down to seal the truck bed cover 100 in the extended cap configuration. The side panels 104 may include one or more locking portions 127, which may receive a locking mechanism 128 of the rear panel 122 to selectively secure the rear panel 122 into place in the cap configuration.

In particular, the truck bed cover 100 may snap, lock, and otherwise be secured in place in the collapsed tonneau configuration and in the extended cap configuration. For example, the truck bed cover 100 may automatically lock into position. Alternatively, the truck bed cover 100 may be locked using a pull-pin lock or other appropriately desired mechanism. In certain embodiments, one or more side panel hinges 126 may lock the truck bed cover onto a truck bed rail 106, to secure the truck bed cover 100 in position. However, as would be understood by someone of ordinary skill in the art, the truck bed cover 100 may be secured within a truck bed using any appropriately desired mechanism.

Figure 6A:
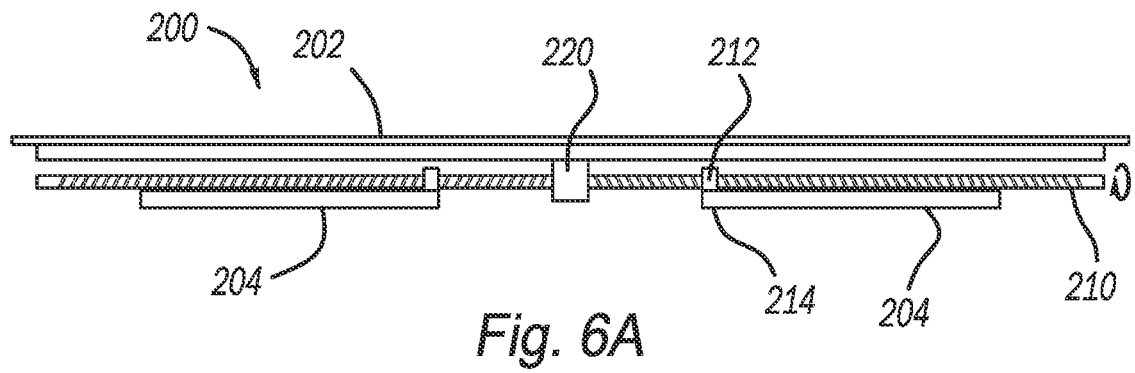
FIG. 6A is a rear view of a second embodiment of a truck bed cover in a collapsed configuration, in accordance with the present technology.
Figure 6B:
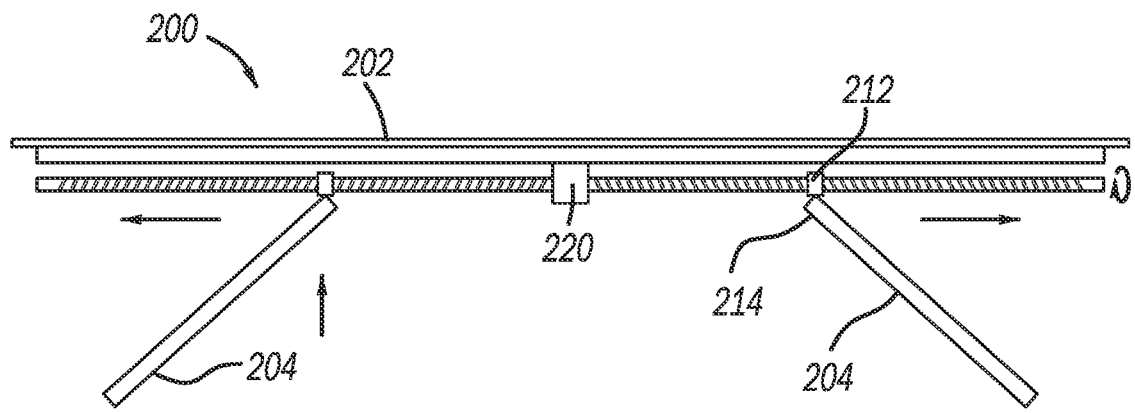
FIG. 6B is a rear view of a second embodiment of a of a truck bed cover in a partially extended cap configuration.
Figure 6C:
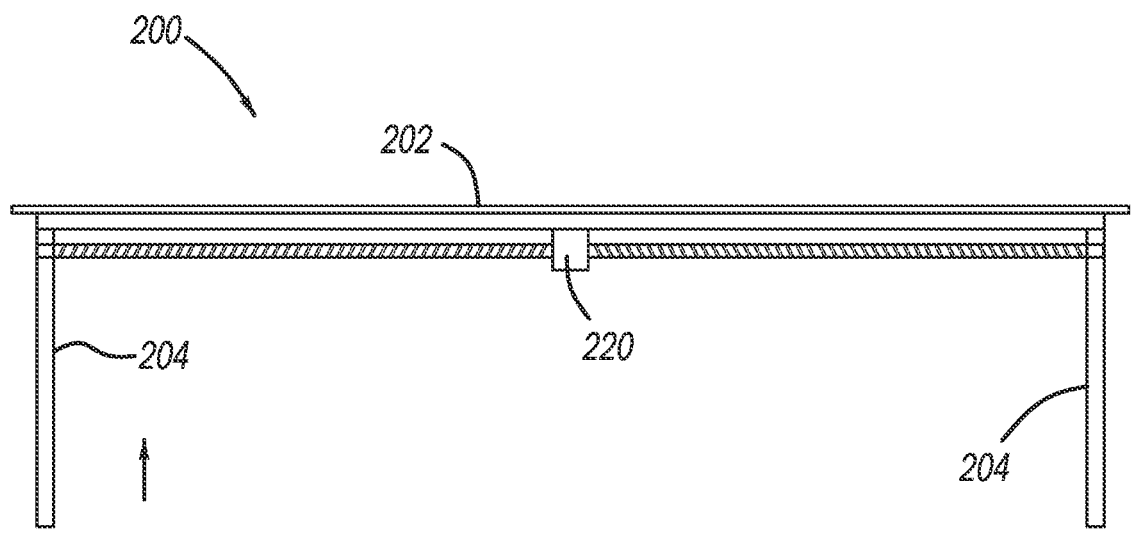
FIG. 6C is a rear view of the second embodiment of the truck bed cover in an extended cap configuration.

FIGS. 6A-6C show a truck bed cover 200 in accordance with another embodiment. The truck bed cover 200 may be similar to the truck bed cover 100. For example, the truck bed cover 200 may include a top panel 202 and a plurality of side panels 204. The side panels 204 may be configured to move about the top panel 202 to move the truck bed cover 200 between a collapsed tonneau configuration and an extended cap configuration.

The truck bed cover 200 may include a motor 220 and a threaded rod 210. The threaded rod 201 may be disposed between the side panels 204 and the top panel 202 in the collapsed tonneau configuration. A connection portion 212 of an edge 214 of the side panels 204 may be connected to the threaded rod 210. The motor 220 may be used to turn the threaded rod 210. In particular, the motor 220 may include any appropriately desired motor 220 capable of turning the threaded rod 210 to raise and lower the truck bed cover 200 and otherwise move the truck bed cover 200 between the collapsed tonneau configuration and the extended cap configuration.

When the threaded rod 210 is turned in a first direction, each of the side panels 204 may be lifted into the extended cap configuration as the respective connection portions 212 move along a length of the threaded rod 210. Similarly, the side panels 204 may be lowered to the collapsed tonneau configuration when the motor 220 rotates the threaded rod 210 in a second opposite direction to move the side panels 204 to the stored position. Advantageously, this configuration allows the user to power the motor 220 to move the truck bed cover 200 between the collapsed tonneau configuration and the extended cap configuration.

Figure 7:
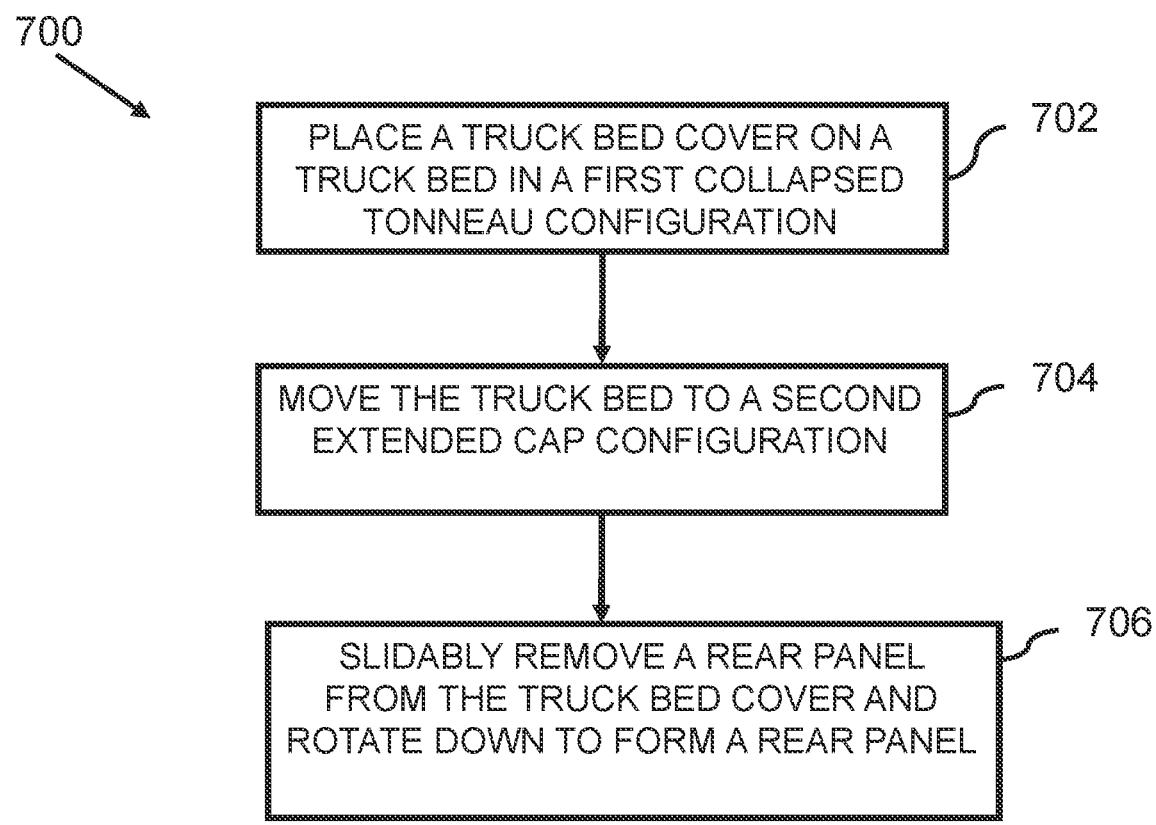
FIG. 7 is a flowchart of a method of using a truck bed cover, in accordance with the present technology.

FIG. 7 illustrates a flowchart of a method 700 of using a truck bed cover 100, 200. In step 702, a truck bed cover 100, 200 is placed on a truck bed 101 in a first collapsed tonneau configuration. In step 704, the truck bed cover 100 is converted or moved from the first collapsed tonneau cover configuration to a second extended cap configuration. In step 706, a rear panel 122 may be slidably removed from a top panel of the truck bed cover 100, 200. The rear panel 122 may be rotated down from the top panel 102, 202 to form the rear panel 122 adjacent to a plurality of side panels 104, 204 of the truck bed cover 100, 200.

In certain embodiments, the method may include actuating a motor 116, 220 of the truck bed cover 100 to move the truck bed cover 100 from the first collapsed tonneau cover configuration to the second extended cap configuration. The motor 220 may be configured to turn a threaded rod 210 to move the truck bed cover 200 between the collapsed tonneau configuration and the extended cap configuration. The motor 116, 220 may include one of a linear motion actuator, a pneumatic arm and a hydraulic motor, or a combination thereof.

Alternatively, the top panel 102, 202 of the truck bed cover 100, 200 may be lifted and/or pushed to move the truck bed cover 100, 200 from the collapsed first tonneau cover configuration to the second extended truck cap configuration. In certain embodiments, the method may further include rotating a front panel 118 from a stored position to form a front panel 118 of the truck bed cover 100, 200. In certain embodiments, a rear panel 122 may be locked to one or more of the side panels 104, 204 of the truck bed cover 100, 200.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods may be made within the scope of the present technology, with substantially similar results.

What is claimed is:

1. A truck bed cover for a truck bed, comprising:
   a top panel;
   a plurality of side panels connected to the top panel, each of the side panels including a connection portion having a slot;
   a track system, the track system including a track disposed on a bottom surface of the top panel; and
   a rear panel slidably disposed within the top panel,
   wherein:
      the top panel and the plurality of side panels are configured to move between a collapsed tonneau configuration and an extended cap configuration,
      the rear panel is configured to slide out from the top panel and rotate down from the top panel to form the rear panel of the truck bed cover in the extended cap configuration,
      each connection portion is curved in shape and configured to be slidably disposed in the track of the track system, and
      the track system is configured for moving the truck bed cover between the collapsed tonneau configuration and the extended cap configuration, each connection portion configured to slide along the track causing each side panel of the plurality of side panels to move outward from a center of the truck bed cover from the collapsed tonneau configuration to the extended cap configuration and to reversibly slide along the track causing each side panel of the plurality of side panels to move inward toward the center of the truck bed cover from the extended cap configuration to the collapsed tonneau configuration.

2. The truck bed cover of claim 1, wherein the rear panel includes a window.

3. The truck bed cover of claim 1, wherein the rear panel includes a rear panel locking portion configured to releasably lock with the side panel locking portion of at least one of the side panels to secure the rear panel in the extended cap configuration.

4. The truck bed cover of claim 1, further including a front panel slidably disposed with the top panel.

5. The truck bed cover of claim 1, wherein each of the side panels is pivotally connected to the truck bed at a first end, and slidably connected to the top panel at a second end, opposite the first end.

6. The truck bed cover of claim 1, wherein the truck bed cover is manually moved between the collapsed tonneau configuration and the extended cap configuration.

7. The truck bed cover of claim 1, further including a motor for moving the truck bed cover between the collapsed tonneau configuration and the extended cap configuration.

8. The truck bed cover of claim 7, wherein the motor comprises one of a linear motion actuator, a pneumatic arm and a hydraulic motor, or a combination thereof.

9. The truck bed cover of claim 7, wherein the motor is configured to rotate a threaded rod for moving the truck bed cover between the collapsed tonneau configuration and the extended cap configuration.

10. The truck bed cover of claim 9, wherein the threaded rod is turned by the motor in a first direction to move the truck bed cover between the collapsed tonneau configuration and the extended cap configuration, and where the threaded rod is turned by the motor in a second direction, opposite the first direction to move the truck bed cover between the extended cap configuration and the collapsed tonneau configuration.

11. The truck bed cover of claim 9, wherein as the threaded rod is rotated, one or more connections of the plurality of side panels are operable to move along a length of the rod.

12. The truck bed cover of claim 1, wherein the connection portion is disposed adjacent a free edge of one of the side panels.

13. The truck bed cover of claim 1, wherein the track is disposed along a length of the top panel.

14. A method of using a truck bed cover comprising:
   providing the truck bed cover, wherein the truck bed cover includes:
      a top panel;
      a plurality of side panels connected to the top panel, each of the side panels including a connection portion having a slot;
      a track system, the track system including a track disposed on a bottom surface of the top panel; and
      a rear panel slidably disposed within the top panel,
      wherein:
         the top panel and the plurality of side panels are configured to move between a collapsed tonneau configuration and an extended cap configuration,
         the rear panel is configured to slide out from the top panel and rotate down from the top panel to form the rear panel of the truck bed cover in the extended cap configuration,
         each connection portion is curved in shape and configured to be slidably disposed in the track of the track system, and
         the track system is configured for moving the truck bed cover between the collapsed tonneau configuration and the extended cap configuration, each connection portion configured to slide along the track causing each side panel of the plurality of side panels to move outward from a center of the truck bed cover from the collapsed tonneau configuration to the extended cap configuration and to reversibly slide along the track causing each side panel of the plurality of side panels to move inward toward the center of the truck bed cover from the extended cap configuration to the collapsed tonneau configuration;
   placing the truck bed cover on a truck bed in a first collapsed tonneau configuration;
   converting the truck bed cover from the first collapsed tonneau cover configuration to a second extended cap configuration;
   slidably removing the rear panel from the top panel of the truck bed; and
   rotating the rear panel down from the top panel to form the rear panel adjacent to the plurality of side panels of the truck bed cover.

15. The method of claim 14, further including actuating a motor of the truck bed cover to move the truck bed cover from the first collapsed tonneau cover configuration to the second extended cap configuration.

16. The method of claim 15 comprising actuating the motor to rotate a threaded rod to move the truck bed cover between the collapsed tonneau configuration and the extended cap configuration.

17. The method of claim 14, further including lifting the top panel of the truck bed cover to convert the truck bed cover from the collapsed tonneau cover configuration to the extended truck cap configuration.

18. The method of claim 14, further including rotating a front panel from a stored position to form a front panel of the truck bed cover.

19. The method of claim 14, further including locking the back panel to a side panel of the truck bed cover.

20. A truck bed cover for a truck bed, comprising:
a top panel;
a plurality of side panels connected to the top panel, each of the side panels including a connection portion having a slot disposed adjacent a free edge and a side panel locking portion disposed on an end adjacent to the truck bed;
a track system, the track system including a track disposed on a bottom surface and along a length of the top panel;
a rear panel slidably disposed within the top panel and including a window and a rear panel locking portion configured to releasably lock with a side panel locking portion of at least one of the side panels to secure the rear panel;
a front panel slidably disposed with the top panel;
wherein:
the top panel and the plurality of side panels are configured to move between a collapsed tonneau configuration and an extended cap configuration,
the rear panel is configured to slide out from the top panel and rotate down from the top panel to form the rear panel of the truck bed cover in the extended cap configuration, and
the side panel locking portion configured to selectively secure the rear panel into place in the cap configuration,
each connection portion is curved in shape and configured to be slidably disposed in the track of the track system, and
the track system is configured for moving the truck bed cover between the collapsed tonneau configuration and the extended cap configuration, each connection portion configured to slide along the track causing each side panel of the plurality of side panels to move outward from a center of the truck bed cover from the collapsed tonneau configuration to the extended cap configuration and to reversibly slide along the track causing each side panel of the plurality of side panels to move inward toward the center of the truck bed cover from the extended cap configuration to the collapsed tonneau configuration.

* * * * *